(12) United States Patent
Majewicz et al.

(10) Patent No.: US 8,594,419 B2
(45) Date of Patent: Nov. 26, 2013

(54) METHOD AND APPARATUS FOR CONVERTING A COLOR IMAGE TO GRAYSCALE

(75) Inventors: Peter Majewicz, Boise, ID (US); Kenneth Kay Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

(21) Appl. No.: 12/614,517

(22) Filed: Nov. 9, 2009

(65) Prior Publication Data

US 2011/0110584 A1    May 12, 2011

(51) Int. Cl.
*G06K 9/00* (2006.01)
(52) U.S. Cl.
USPC .......................................................... 382/162
(58) Field of Classification Search
USPC ................................. 382/162–167
See application file for complete search history.

(56) References Cited

U.S. PATENT DOCUMENTS

2003/0068081 A1*  4/2003  Jia et al. ......................... 382/162
2006/0227149 A1* 10/2006  Cain ............................. 345/594

* cited by examiner

*Primary Examiner* — Alex Liew
(74) *Attorney, Agent, or Firm* — Steven L. Webb

(57) ABSTRACT

A method and apparatus for converting a color digital image into a grayscale digital image is disclosed. First, each green intensity value in the color digital image is copied into a corresponding pixel location of the grayscale digital image. Then for each red intensity value in the color digital image, the red intensity value is adjusted to match a local dynamic range of green intensity values. The adjusted red intensity value is inserted into the corresponding pixel location of the grayscale digital image. Then for each blue intensity value in the color image, the blue intensity value is adjusted to match a local dynamic range of green intensity values. The adjusted blue intensity value is inserted into the corresponding pixel location of the grayscale digital image.

15 Claims, 2 Drawing Sheets

FIG. 1
*(PRIOR ART)*
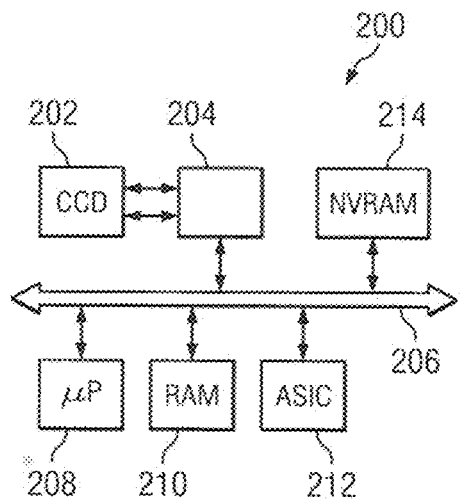
FIG. 2
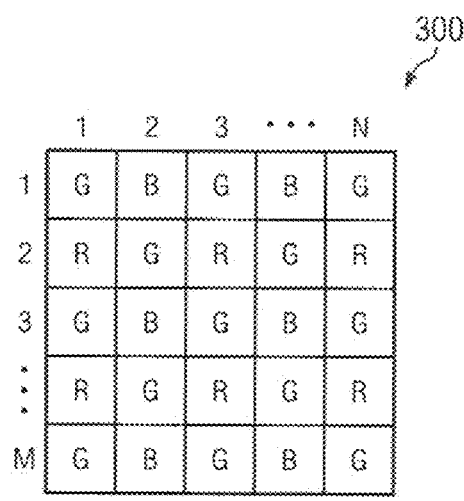
FIG. 3

METHOD AND APPARATUS FOR CONVERTING A COLOR IMAGE TO GRAYSCALE

BACKGROUND

Many image capture devices use either a charged coupled device (CCD) or a complementary metal oxide semiconductor (CMOS) device to capture the image. Both types of devices are typically sensitive to light across the entire visible spectrum. When a device is used to captures a color image, the device is typically overlaid with a pattern of red, green and blue color filters. One common pattern used to arrange the color filters across a device is a Bayer pattern. In this application, a CCD will be used to represent both a CCD and a CMOS type of device.

The Bayer filter pattern is a repetitive grid of red, green, and blue sub-filters overlaying the CCD array (sec FIG. 1). Adding a Bayer filter transforms the array from an array that is equally sensitive to a wide spectrum of light, into an array that is individually sensitive to red, green, and blue wavelength bands. It enables the capture of color scene in three colors (red, green and blue). It is a de facto element of most color digital cameras. The image resulting from a Bayer filter is a color mosaic of red, green and blue, pixels.

There are times when it is desirable to capture an image as a grayscale image, instead of capturing the image in color. For example, when capturing an image of a printed document a grayscale image may be more useful. Unfortunately having a second CCD without color filters, is costly. Therefore most color capture devices convert the captured color image into a grayscale image when a grayscale image is desired.

Converting a color image into a grayscale image can be done using a number of different techniques. One technique is Green bi-linear interpolation. This is a somewhat low complexity solution that is susceptible to aliasing. It also yields a lower resolution grayscale image because it ignores the information in the red and blue pixels. Other techniques may provide a high quality grayscale image, but may require large amounts of computation, have large storage requirements, or require significant time to complete.

BRIEF DESCRIPTION OF THE DRAWINGS

FIG. 1 is diagram of a Bayer filter.

FIG. 2 is a block diagram of a digital imaging device 200 in an example embodiment of the invention.

FIG. 3 is a diagram of a color image captured by CCD 202, in an example embodiment of the invention.

DETAILED DESCRIPTION

Figure 4:
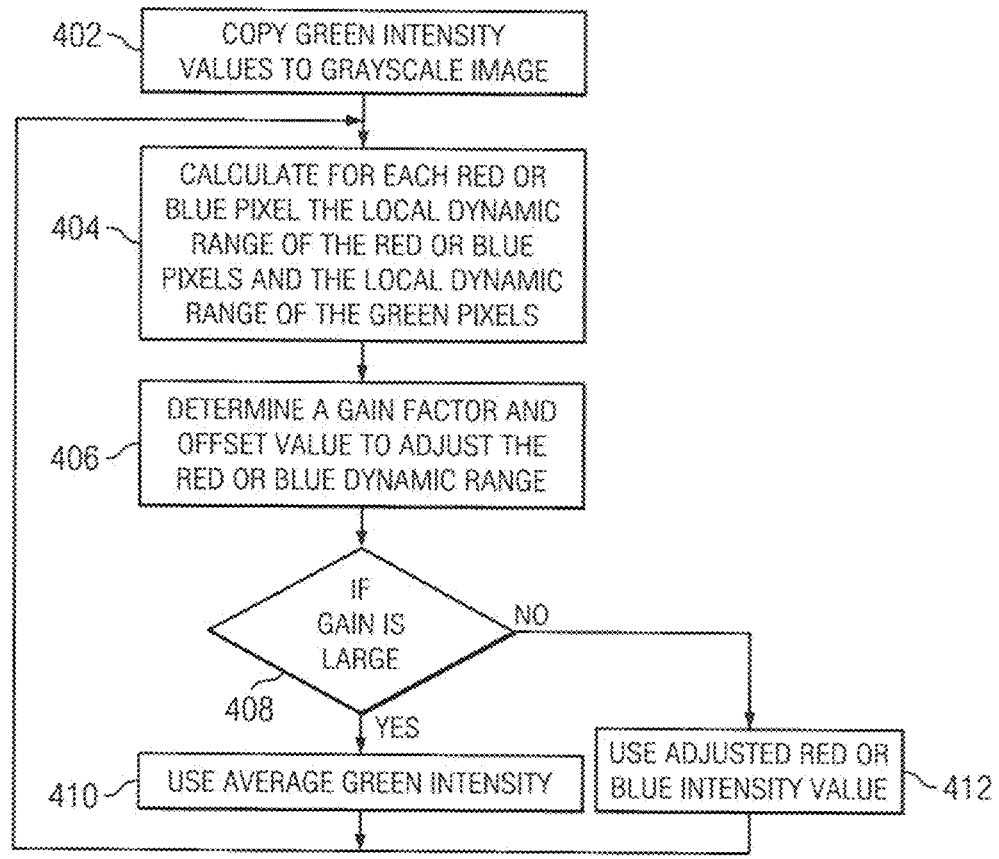
FIG. 4 is a flow chart for converting a color image into a grayscale image using Local Area Dynamic Range Equalization in an example embodiment of the invention.

FIGS. 1-5, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 is a block diagram of a digital imaging device 200 in an example embodiment of the invention. Digital imaging device 200 comprises a CCD 202, a shift registers 204, a system bus 206, a micro-processor 208, random access memory (RAM) 210, an application specific integrated circuit (ASIC) 212, and non-volatile random access memory (NVRAM) 214. CCD 202 is coupled to shift register 204, Shift register 204, micro-processor 208, RAM 210, ASIC 212, and NVRAM 214 are coupled together across system bus 206. In other example embodiments of the invention, one or more of the other components of the system may be integrated into ASIC 212, for example Shift register 204, micro-processor 208, RAM 210, and the like.

In operation, an image is captured using CCD 202. The image is transferred from CCD 202 into shift registers 204. Once in shift registers 204, the image, may be transferred into RAM 210, manipulated by micro-processor 208, ASIC 212, or both, or saved in NVRAM 214. Some digital imaging devices may have additional image processing components, for example a color matrix, that are not shown for clarity.

In one example embodiment of the invention, digital imaging device 200 may be a device that has a primary function of capturing digital images, for example a digital camera. In other example embodiments of the invention the digital device, may incorporate a image capture device into another device, for example a cell phone, a laptop computer, or the like.

In one example embodiment of the invention, the pixels in CCD 202 are covered with a Bayer pattern of red, green and blue color filters. Therefore CCD 202 produces a matrix of color intensities that represent the captured color image. One type of image manipulation that may occur in digital imaging device 200 is the conversion of the color image into a grayscale image. This type of conversion may be done by the micro-processor 208, the ASIC 212, or a combination of both the ASIC 212 and micro-processor 208. ASIC 212 may be a hardware implementation of the algorithm used to convert the color image into the grayscale image.

In some example embodiments of the invention, the color image may be transferred to a computer, and the computer may convert the color image into a grayscale image. The computer may be a personal computer (PC) or a network device, for example a server.

FIG. 3 is a diagram of a color image captured by CCD 202 in an example embodiment of the invention. Color image 300 comprises 1-M rows and 1-N columns of intensity values. The intensity values are for the red, green, and blue colors arranged in a Bayer pattern. For example, the first row of image 300 alternates between green (G) and blue (B) intensity values and the second row of image 300 alternates between red (R) and green (G) intensity values. In one example embodiment of the invention, the color image 300 will be converted into a grayscale image using Local Area Dynamic Range Equalization (LADRE).

LADRE equalizes the dynamic range of the red and blue intensity values to match the dynamic range of the green intensity values inside small overlapping areas of the image. The red and blue intensity values are equalized to the dynamic range of nearby green pixels. In one example embodiment of the invention, the pixels in a 5 by 5 area or window surrounding each of the red or blue pixels, are used to determine a local green dynamic range. The red or blue intensity value is then equalized to this local green dynamic range. In other example embodiments, other size windows may be used to determine the local dynamic range of the green pixels. The dynamic range of the existing green intensity values do not need to be adjusted. Therefore the first step in converting the color image into a grayscale image is to copy the green intensity value into the target grayscale image as grayscale intensity values.

FIG. 4 is a flow chart for converting a color image into a grayscale image using Local Area Dynamic Range Equalization in an example embodiment of the invention. At step 402, each of the green intensity values in the original color image is copied into a corresponding pixel location in the new grayscale image. At step 404, for each red or blue pixel location, the local dynamic range of the red or blue pixels is determined. The local dynamic range of the green pixels is also determined. At step 406 a gain factor and offset value are calculated for use in adjusting the intensity value of the red or blue pixel. At step 408, a check is made to determine if the gain factor is large by checking to see if the gain value is above a threshold value. When the gain factor is above the threshold value, flow continues at step 410. When the gain factor is below the threshold value, flow continues at step 412. In step 410, an average local green intensity value is determined and inserted into the corresponding pixel location in the new grayscale image. Flow then returns to step 404. In step 412, the red or green intensity value is adjusted using the offset value and gain factor and inserted into the corresponding pixel location in the new grayscale image. Flow then returns to step 404.

Figure 5:
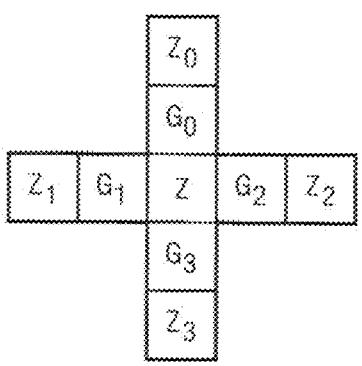
FIG. 5 is a 5×5 bi-lateral sliding window in an example embodiment of the invention.

In one example embodiment of the invention, a sliding window is used in step 404 to determine the local dynamic ranges of the red, green and blue pixels in the original color image. FIG. 5 is a 5×5 bi-lateral sliding window in an example embodiment of the invention. The 5×5 bi-lateral window is slid across the color image and centered on each red and blue pixel. In other example embodiments of the invention, other sized windows, and/or other patterns of pixels inside the window, may be used as the sliding window. Let Z be the center pixel in the window shown in FIG. 5. Let $Z_0, Z_1, Z_2, Z_3$ be the nearest corresponding red or blue pixels that are a 2 pixel distance above, left, right, and below Z. Let $G_0, G_1, G_2, G_3$ be the green pixels that are immediately above, left, right, and below Z. The local maximums and minimums of the window are $$Z_{max} = \max(Z_0, Z_1, Z_2, Z_3, Z) \quad (1)$$

$$Z_{min} = \min(Z_0, Z_1, Z_2, Z_3, Z) \quad (2)$$

$$G_{max} = \max(G_0, G_1, G_2, G_3) \quad (3)$$

$$G_{min} = \min(G_0, G_1, G_2, G_3) \quad (4)$$

The local dynamic ranges are $$Z_{range} = \max(Z_{max} - Z_{min}, 1) \quad (5)$$

$$G_{range} = G_{max} - G_{min} \quad (6)$$

Now, linear equalization of the dynamic ranges requires an offset term and a gain factor to stretch or compress the red or blue intensity range into the green intensity range. The offset term is simply the minimum green intensity value $$\text{offset} = G_{min} \quad (7)$$

The gain term is $$\text{gain} = \frac{(G_{range} << 8)}{Z_{range}} \quad (8)$$

where <<8 denotes 8 up-shifts which is equivalent to a multiplication of $2^8$. In one example embodiment of the invention, LADRE may be used in a low-cost embedded system. Therefore 8 bit/pixel is assumed for each color intensity value, and all operations are integer arithmetic. The <<8 in Equation (8) avoids the need for a fraction and therefore gain can be stored as an integer value rather than a float value. The new grayscale value Z' for the pixel is given by equation 9.

$$Z' = (((Z - Z_{min}) * \text{gain}) >> 8) + \text{offset} \quad (9)$$

where >>8 denotes 8 downshifts which is equivalent to a division of $2^8$. Equation (9) may produce erratic swings in Z' if gain is large. A strong mosaic pattern occurring on an edge or thin line may cause a large gain. Experimentation shows that if gain exceeds approximately 40:1, then the dynamic range equalization produces excessive noise and edge aliasing. In this case, LADRE averages the surrounding green pixels. It applies Equation (10) instead of Equation (9).

$$Z'(G_0 + G_1 + G_2 + G_3) >> 2 \quad (10)$$

In pseudo-code, the decision is

```
if gain < k then
    use Equation (9)
else
    use Equation (10)
``` where k≅10240.

When the sliding window shown in FIG. 5 is at a corner of the image, or along an edge of the image, some pixels will be missing. In one example embodiment of the invention, the missing pixels may be replaced by replicating the value of the mirrored pixels.

Local Area Dynamic Range Equalization (LADRE) was described equalizing the local dynamic range of red and blue pixels value to the green pixel values produced using a Bayer filter pattern. LADRE is not limited to use with color images produced using a Bayer color filter pattern, other color filter patterns can be equalized using the LADRE method. LADRE is also not limited to red, green and blue color images. Other color filter sets may be equalized, for example cyan, magenta, and yellow (CYM).

What is claimed is:

1. A method, comprising:
    copying each green intensity value in a raw color digital image from an area sensor array into a corresponding pixel location of a grayscale digital image where each pixel in the color digital image has only one color intensity value, either a blue intensity value, a green intensity value or a red intensity value;
    for each red intensity value in the color digital image:
        adjusting the red intensity value to match a local dynamic range of green intensity values;
        inserting the adjusted red intensity value as the grayscale intensity value of the corresponding pixel location of the grayscale digital image:
    for each blue intensity value in the raw color image:
        adjusting the blue intensity value to match a local dynamic range of green intensity values;
        inserting the adjusted blue intensity value as the grayscale intensity value of the corresponding pixel location of the grayscale digital image.

2. The method of claim 1, further comprising:
    for each red intensity value in the color digital image:
        determine a local dynamic range of red intensity values;

determine a local dynamic range of green intensity values;

using the local dynamic range of red intensity values and the local dynamic range of green intensity values, calculate an offset value and a gain factor;

when the gain factor is above a threshold, adjusting the red intensity value by substituting an average local green intensity value as the grayscale intensity value of the corresponding pixel location of the grayscale digital image;

when the gain factor is not above a threshold, adjusting the red intensity value with the gain factor and offset value and inserting the adjusted red intensity value into the corresponding pixel location of the grayscale digital image;

for each blue intensity value in the color image:

determine a local dynamic range of blue intensity values;

determine a local dynamic range of green intensity values;

using the local dynamic range of blue intensity values and the local dynamic range of green intensity values, calculate an offset value and a gain factor;

when the gain factor is above a threshold, adjusting the blue intensity value by substituting an average local green intensity value as the grayscale intensity value of the corresponding pixel location of the grayscale digital image;

when the gain factor is not above a threshold, adjusting the blue intensity value with the gain factor and offset value and inserting the adjusted blue intensity value into the corresponding pixel location of the grayscale digital image.

3. The method of claim 2, wherein a plurality of pixels in a window, centered on a currently selected pixel, are used to determine the local dynamic ranges.

4. The method of claim 3, wherein the window is a 5 by 5 bi-lateral window centered on the currently selected pixel.

5. The method of claim 2, wherein the offset value is the minimum green intensity value of the plurality of pixels in the window.

6. The method of claim 2, wherein the threshold value is set to be equivalent to a gain of 40 to 1.

7. The method of claim 1, wherein each red and blue intensity value is adjusted using only integer arithmetic.

8. The method of claim 1, wherein the color digital image has the red, green and blue intensity values arranged in a Bayer pattern.

9. The method of claim 1, further comprising:

saving the grayscale digital image into non-volatile memory.

10. A digital device, comprising:

a processor coupled to a memory, the processor to convert a color image stored in the memory into a grayscale image by copying each green intensity value in the color digital image into a corresponding pixel location of the grayscale digital image where each pixel in the color image has only one color intensity value, either a blue intensity value, a green intensity value or a red intensity value;

the processor to, for each red pixels in the color image:

determine a local dynamic range of red intensity values;

determine a local dynamic range of green intensity values;

using the local dynamic range of red intensity values and the local dynamic range of green intensity values, calculate an offset value and a gain factor;

when the gain factor is above a threshold, insert an average local green intensity value as the grayscale intensity value of the corresponding pixel location of the grayscale digital image;

when the gain factor is not above a threshold, adjusting the red intensity value with the gain factor and offset value and inserting the adjusted red intensity value into the corresponding pixel location of the grayscale digital image;

the processor configured to, for each blue pixel in the color image;

determine a local dynamic range of blue intensity values;

determine a local dynamic range of peen intensity values;

using the local dynamic range of blue intensity values and the local dynamic range of green intensity values, calculate an offset value and a gain factor;

when the gain factor is above a threshold, inserting an average local green intensity value as the grayscale intensity value of the corresponding pixel location of the grayscale digital image;

when the gain factor is not above a threshold, adjusting the blue intensity value with the gain factor and offset value and inserting the adjusted blue intensity value into the corresponding pixel location of the grayscale digital image.

11. The digital device of claim 10, further comprising:

a charge coupled device (CCD) coupled to the memory and to the processor and used to capture the color image.

12. The digital device of claim 10, further comprising:

a non-volatile memory coupled to the processor wherein the processor stores the grayscale image onto the non-volatile memory.

13. The digital device of claim 10, wherein the digital device is selected from one of the following types of digital devices: a digital camera, a cell phone, a laptop computer, a personal computer (PC), and a network server.

14. The digital device of claim 10, wherein each red and blue intensity value is adjusted using only integer arithmetic.

15. The digital device of claim 10, wherein a plurality of pixels in a 5 by 5 bi-lateral window, centered on a currently selected pixel, are used to determine the local dynamic ranges.

* * * * *

UNITED STATES PATENT AND TRADEMARK OFFICE
CERTIFICATE OF CORRECTION

PATENT NO.        : 8,594,419 B2                                 Page 1 of 1
APPLICATION NO.   : 12/614517
DATED             : November 26, 2013
INVENTOR(S)       : Peter Majewicz et al.

It is certified that error appears in the above-identified patent and that said Letters Patent is hereby corrected as shown below:

In the Claims

In column 4, line 58, in Claim 1, delete "image:" and insert -- image; --, therefor.

In column 6, line 22, in Claim 10, delete "image;" and insert -- image: --, therefor.

In column 6, line 25, in Claim 10, delete "peen" and insert -- green --, therefor.

Signed and Sealed this
Fourth Day of March, 2014

Michelle K. Lee
*Deputy Director of the United States Patent and Trademark Office*